Aug. 18, 1925.
G. A. SCHWER ET AL
1,550,104
OIL BURNING ENGINE
Filed March 23, 1923   5 Sheets-Sheet 4
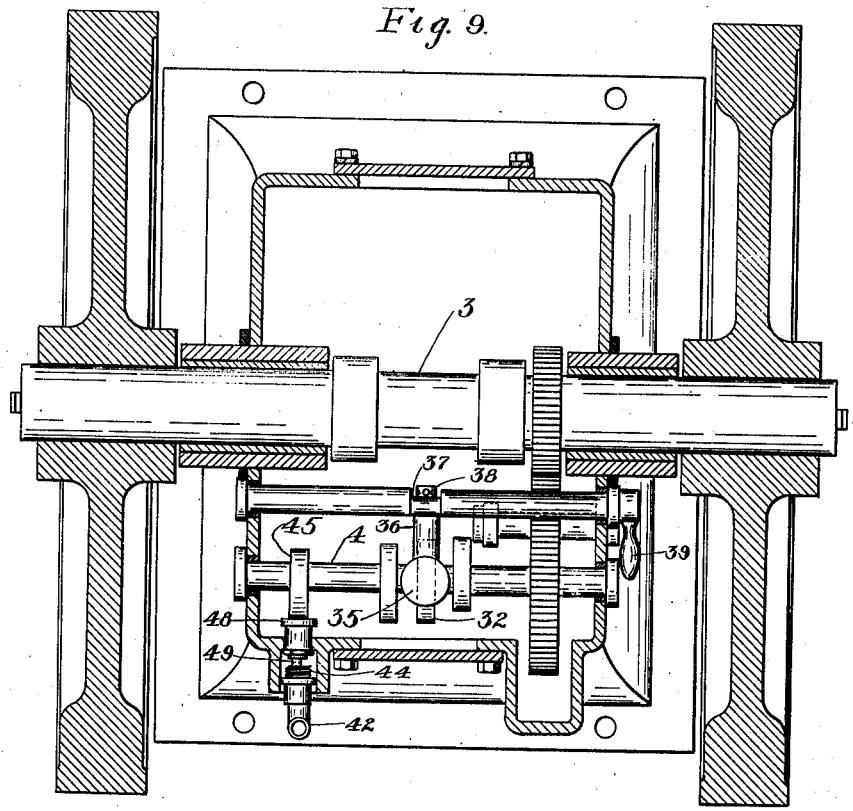
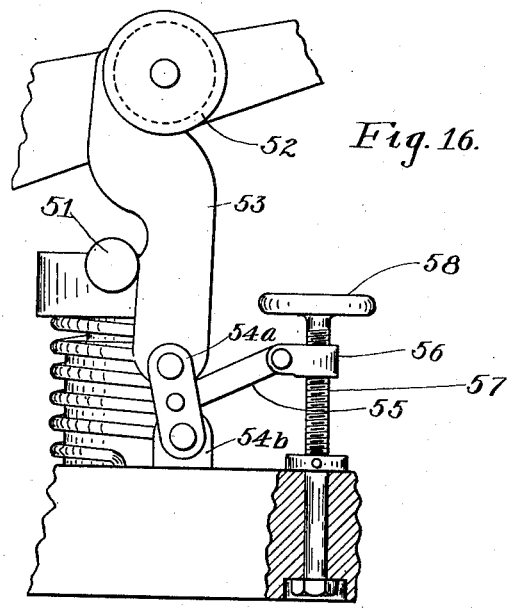

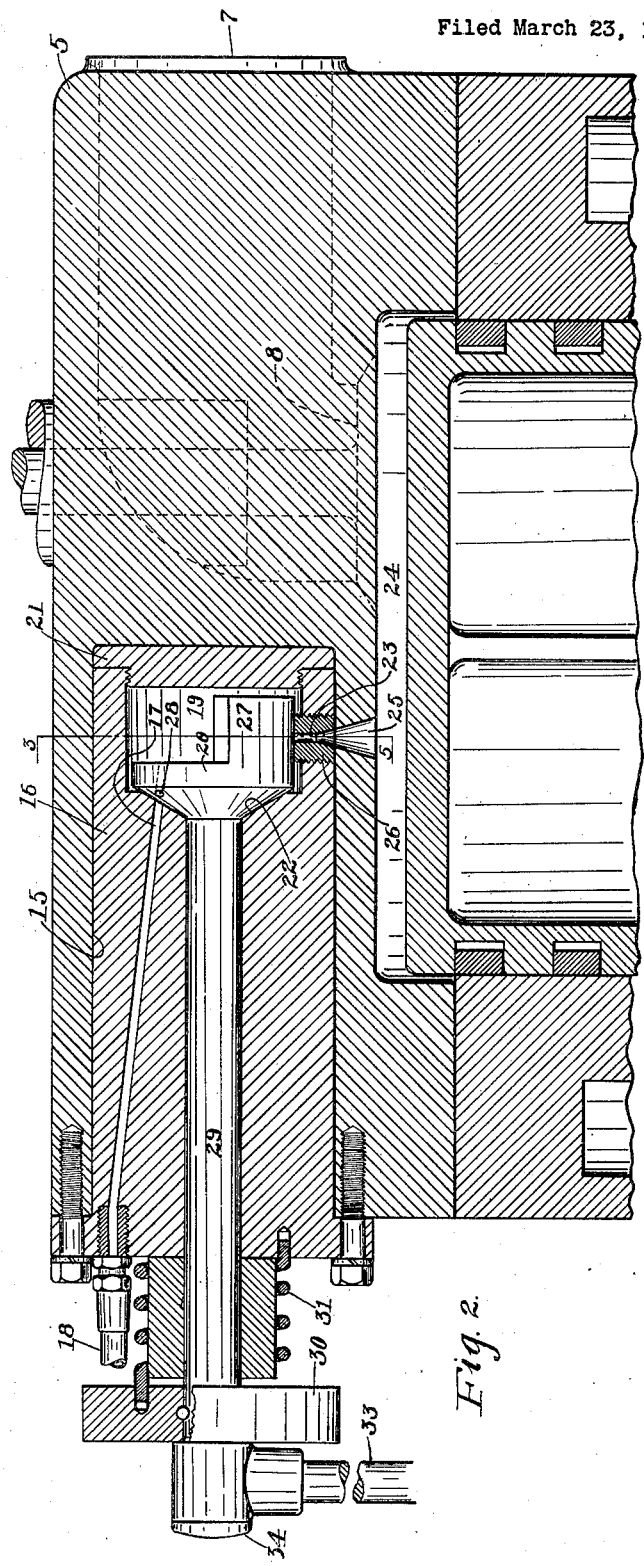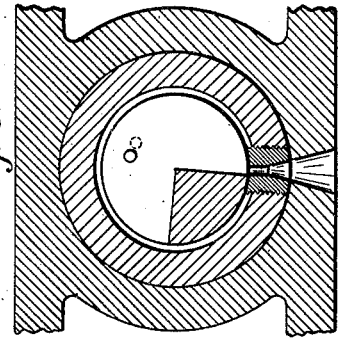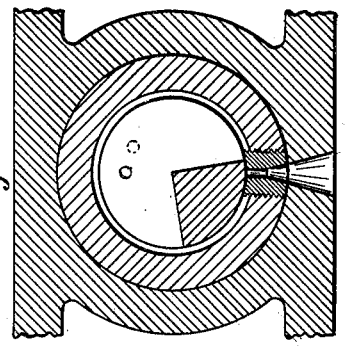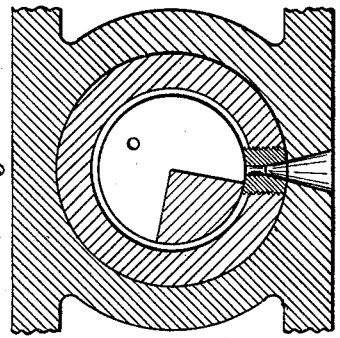

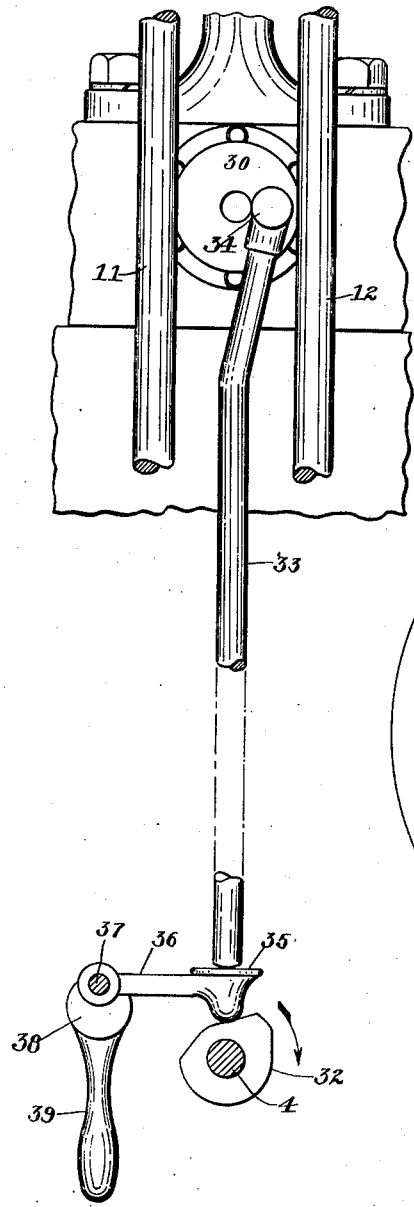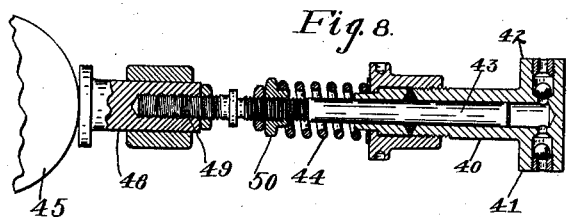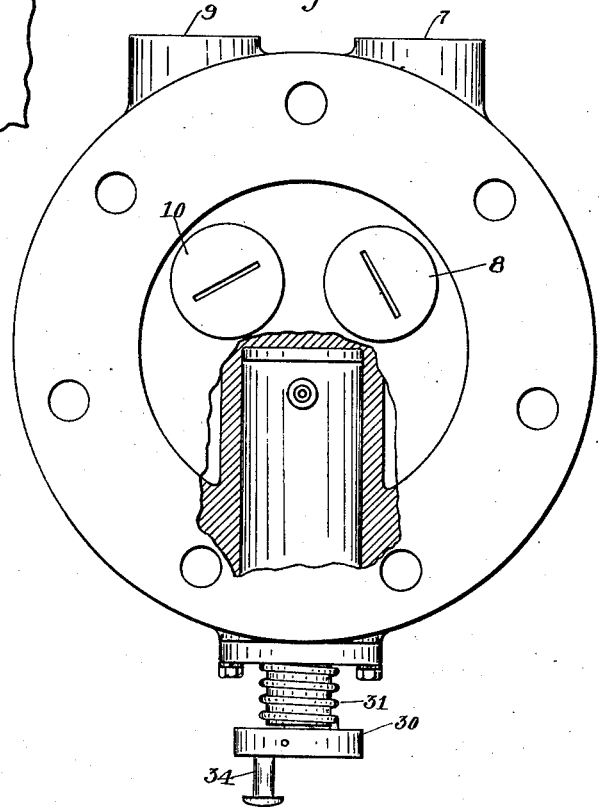

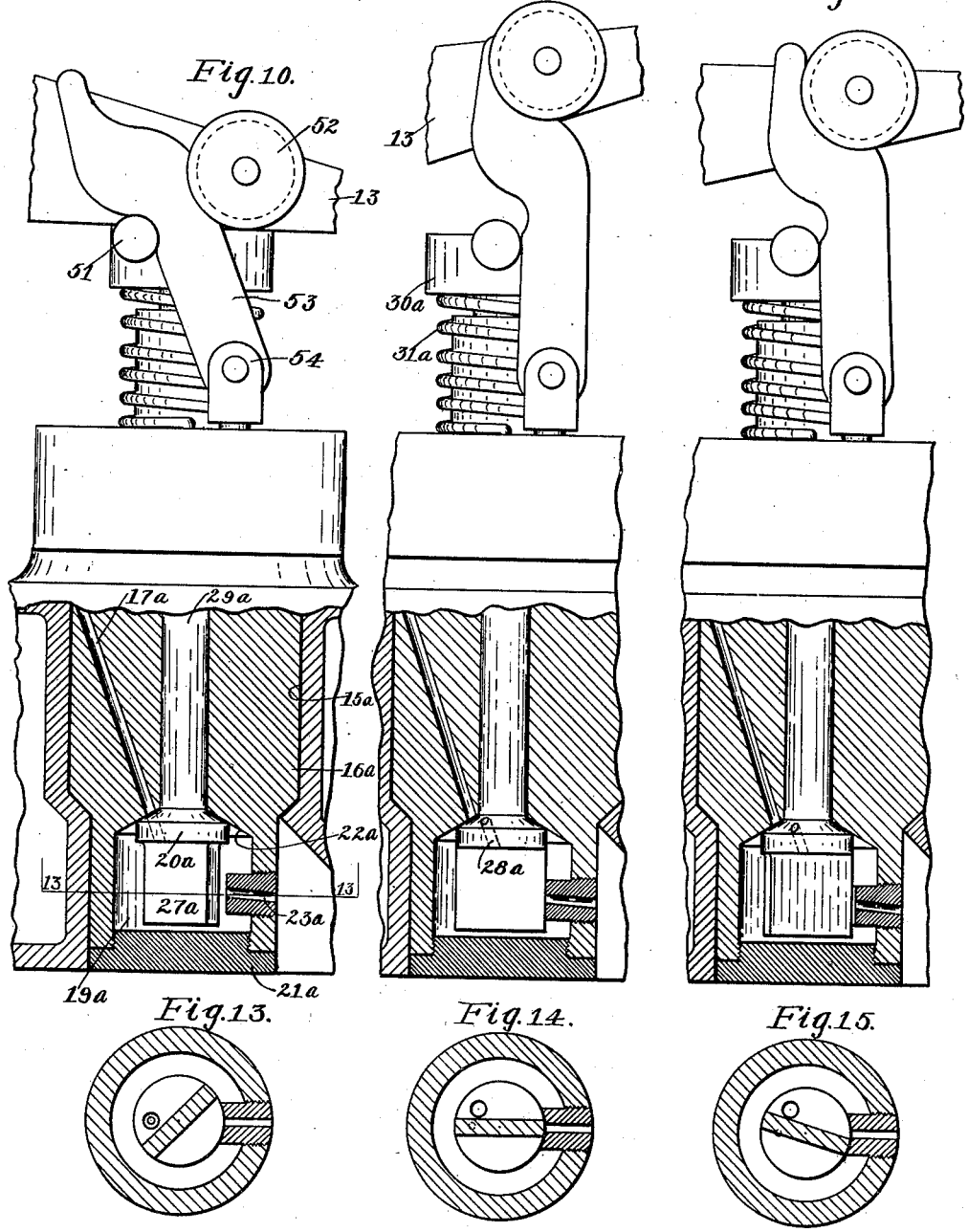

Patented Aug. 18, 1925.

1,550,104

UNITED STATES PATENT OFFICE.

GEORGE A. SCHWER AND OTTO E. BORNHAUSER, OF SANDUSKY, OHIO.

OIL-BURNING ENGINE.

Application filed March 23, 1923. Serial No. 627,161.

*To all whom it may concern:*

Be it known that we, GEORGE A. SCHWER and OTTO E. BORNHAUSER, citizens of the United States, both residing at Sandusky, in the county of Erie and State of Ohio, have invented a new and useful Improvement in Oil-Burning Engines, of which the following is a specification.

This invention relates to improvements in oil burning engines of the type in which the heat of compression is utilized for ignition and the ignition is effective to cause the discharge into the combustion space of a charge of fuel maintained in a cup communicating with such space, the fuel being supplied to the cup during the suction stroke.

The principal objects of the invention are to make simple and effective provision in an engine of the type referred to for the positive timing of the ignition and to insure that the ignition will take place precisely at the period determined upon, without regard to the particular degree of compression in the cylinder so long as it is sufficient to produce ignition. In this way in a multi-cylinder engine the timing of the ignition is made wholly independent of any lack of compression balance in two or more of the cylinders.

A further object is to simplify and improve the structure of the fuel injection parts carried by the cylinder head.

A further object is to provide for varying, i. e., advancing or retarding, the positively and certainly timed ignition.

With the above objects in view the invention consists generally in novel features of structure and relation appertaining to the fuel valve and the fuel cup and affecting their co-operation with one another and with the combustion space of the engine cylinder, whereby are developed novel and advantageous characteristics of operation, and also in certain novel features of the operating connections for the fuel cup, all of which features will be set forth in necessary detail as the description proceeds.

Embodiments of the invention are illustrated in the accompanying drawings, wherein:

Figure 2 is an enlarged detail view of the cylinder head and the fuel valve fitted therein.

Figures 3, 4 and 5 are cross sectional views of the fuel valve on the line 3—5 of Figure 2 and showing the three different operative positions of said valve, the position of Figure 3 being effected during the suction stroke, the position of Figure 4 during the compression stroke and the position of Figure 5 during the power and exhaust strokes.

Figure 6 is a bottom plan view partly in section of the cylinder head in which the fuel valve is fitted.

Figure 7 is an elevation showing the fuel valve operating connections.

Figure 8 is a detail sectional view of a pump by means of which a measured charge of fuel may be delivered to the fuel cup.

Figure 9 is a detail view showing the cam shaft and related parts.

Figures 10 to 15 illustrate a modified construction.

Figure 10 is a view showing in vertical section the modified form of fuel valve and in elevation the operating connections therefor, the parts being shown in positions conforming to the suction stroke.

Figure 11 is a similar view but with the parts in positions conforming to the compression stroke.

Figure 12 is a similar view but with the parts in positions conforming to the power and exhaust strokes.

Figure 1:
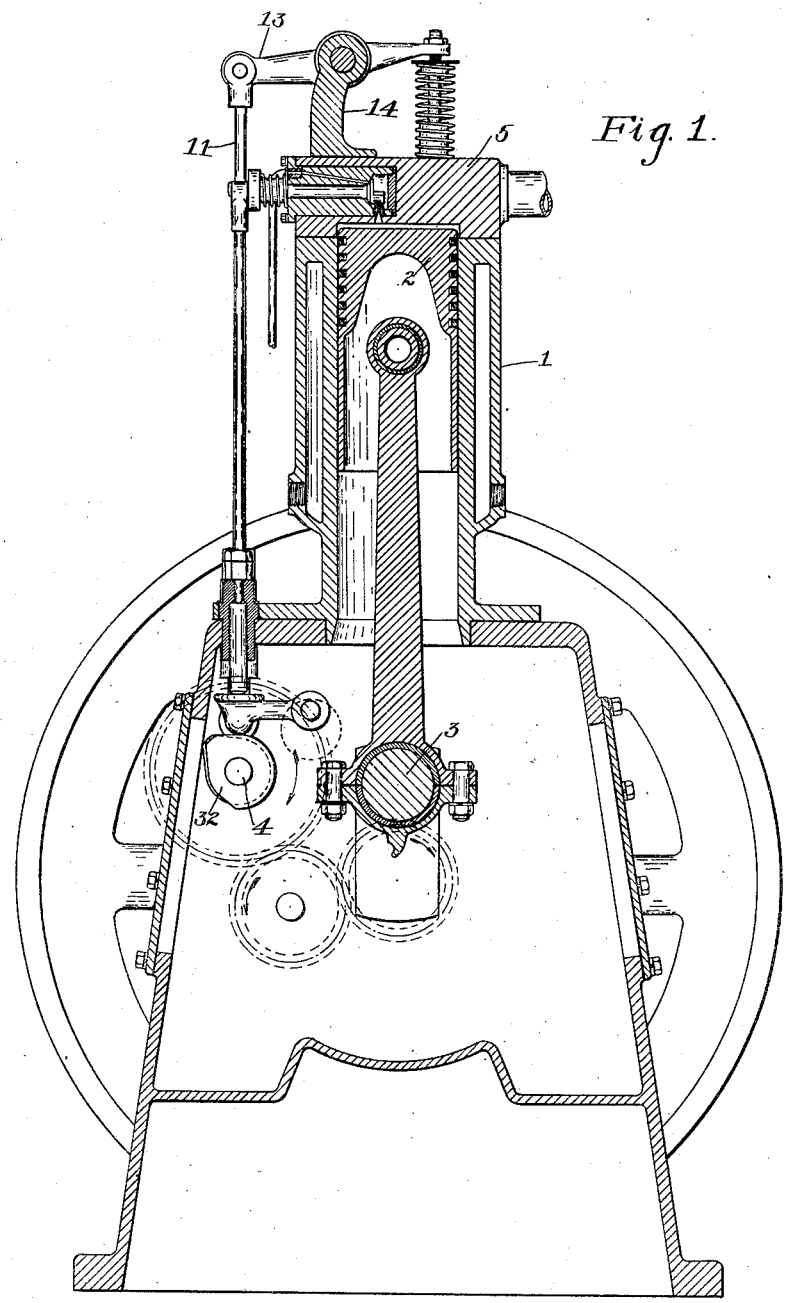
Figure 1 is a vertical sectional view of an engine equipped with a fuel valve which, as now considered, is preferred.

Figures 13, 14 and 15 are horizontal sectional views of the valve in positions conforming respectively to Figures 10, 11 and 12, the section being taken in the plane of the line 13—13 of Figure 10.

Figure 16 is a detail elevation showing means, applicable to the operating connections shown in Figures 10 to 12, for varying the timing of the ignition.

The features of the invention are applicable to either four stroke cycle or two stroke cycle engines, to single cylinder or multi-cylinder engines, and to engines of either horizontal or vertical type. The engine itself, considered apart from the fuel valve features, forms no part of the invention.

In Figure 1 a four stroke cycle engine of the vertical type is indicated by the showing of the cylinder 1, the piston 2, the crank shaft 3, the cam shaft 4 and the cylinder head 5 provided, as shown in Figure 6, with an air intake 7, air intake valve 8, exhaust 9 and exhaust valve 10, all in conformity with established or approved practice. The valves 8 and 10 are, as usual, spring loaded and are operated by rocker arms worked from the cam shaft by connecting rods 11 and 12 (Figure 7) respectively. Figure 1 shows the rocker arm 13 for the inlet valve 8, the rocker arm being mounted on a supporting bracket 14 which also carries a similar rocker arm (not shown) for the exhaust valve 10.

The head 5 is formed with a bore 15 in which is fitted a plug 16, provided with a fuel duct 17 suitably connected to the fuel feed pipe 18. The duct 17 discharges into a fuel cup 19 and its communication with said cup is controlled by the fuel valve 20. The cup 19 may be formed and combined with the plug 16 in any suitable manner but, as shown and preferred, it is in the form of a cylindrical chamber and is completed by an end wall 21 which has threaded engagement with the annular wall of said chamber.

The engaging face of the valve 20 is preferably tapering and co-operates with a seat 22 to which the duct 17 opens. The cup 19 is provided with a lateral opening 23 through which the fuel is discharged into the combustion space 24. In the construction shown in Figure 2 the plug 16 is fitted horizontally in the head 5 and the cylindrical wall of the bore 15 completely encircles the cup 19. The opening 23 extends from the lower side of the cup 19 and is continued by an opening 25 in the cylindrical wall of the bore 15 and in constant open communication with the combustion space 24. The opening 23 is preferably formed in a hardened bushing 26 which is suitably fitted in the cylindrical wall of the cup 19.

The positive timing of the ignition according to the invention depends on the closure of the discharge opening of the fuel cup during the compression stroke until the period of such stroke at which it is desired that ignition shall occur at which time the discharge opening is uncovered whereby to establish its communication with the engine cylinder. The discharge opening 23 is accordingly controlled by a valve 27 for the operation of which the fuel valve 20 may be utilized. One feature of the invention which may be practiced in connection with the provision of the valve 27 consists in making the fuel discharge opening 23 unrestricted in size. By this is meant an opening which may be of uniform size for all the hydrocarbon fuels for which the engine is available and which is sufficiently large to provide for ignition in the fuel cup immediately that the valve 27 is moved to open position and regardless of the period of the compression stroke at which this occurs, (and hence of the degree of compression) so long as the heat of compression has been raised to the firing point of the most volatile constituents of the fuel charge. By virtue of an opening of such character a combustible mixture completed by air from the combustion space is at once formed and ignited in the fuel cup immediately that the fuel discharge opening is uncovered, without regard to the grade of hydrocarbon fuel being used (the lowest grades having a sufficient percentage of more volatile constituents) or to the particular degree of compression and heat of compression existing at the time. For these results the discharge opening of the fuel cup is sufficiently large to provide for the substantially immediate and continuous balancing or equalization of the pressures in the fuel cup and in the combustion space of the cylinder and is therefore best characterized as "unrestricted" to distinguish it from the fuel cup discharge openings of known oil burning engines which in order to prevent premature firing have had to be carefully calculated to a particular diameter determined with regard to the particular grade of fuel with which the engine was intended to operate and the particular period of the compression stroke at which the ignition should best be timed to occur. Where such an unrestricted fuel cup discharge opening is used it is unnecessary to provide for the admission of a separate air charge into the fuel cup during the period of fuel admission since the combustible mixture in the cup may in any case be completed by air from the combustion space immediately that the fuel discharge opening is uncovered. The construction shown in the drawing is one which thus utilizes the air in the combustion space. While the fuel cup may of course be provided with a separate air inlet (in accordance with known practice) if desired, the provision of this feature accomplishes no useful purpose where the fuel cup discharge opening is unrestricted and closed during the compression stroke up to the period of firing. The ignition or explosion of the combustible mixture in the fuel cup effects the discharge, in a more or less vaporized and finely divided condition, of the rest of the oil charge into the combustion space where it is completely consumed.

Where the valve 20 is utilized for the operation of the valve 27, the mounting of the two valves and the operative connections between them may be of any suitable character. Certain specific characteristics of the valve structure shown and preferred constitute a feature of the invention and involve the operative connection of the valve 27, preferably integrally or rigidly, to a constantly seated main valve. Thus the valve 20 is constantly held to its seat 22 upon which it turns and is provided between its end faces with a fuel passage 28 which may be moved into or out of register with the duct 17; and the valve 27 is formed as an integral angular extension of the valve 22 and is provided with a cylindrically curved engaging face. The valve 20 is provided with an axially projecting operating stem 29 which is journaled in the plug 16 and projects beyond the outer end of said plug, its projecting portion being provided with an operating head 30. The valve 20 is acted on by a helical spring 31 which acts both torsionally and expansively and constantly holds said valve to its seat 22, the spring 31 surrounding the projecting end of the stem 29 and having its terminals secured to the plug 16 and head 30 respectively.

Figures 3, 4 and 5 illustrate the several positions of the valves 22 and 27 for the different strokes. At any suitable period of the suction stroke the valve 20 is moved to aline its passage 28 with the duct 17, the valve 27 participating in such movement and uncovering the fuel discharge opening 23. These positions of the valves 20 and 27 are shown in Figure 3 and at such time a charge of hydrocarbon fuel is delivered to the cup 19. At or prior to the beginning of the compression stroke the valves 20 and 27 are moved to the positions of Figure 4 in which positions the valve 20 closes the duct 17 and the valve 27 closes the discharge opening 23. At a suitable point in the compression stroke the valves 20 and 27 are moved to the positions of Figure 5, in which the valve 20 maintains the closure of the duct 17 but the valve 27 completely uncovers the discharge opening 23. At this instant, owing to the heat of compression, ignition takes place and the piston thereafter moves on its power and scavenging strokes during which the valves 20 and 27 remain in the position of Figure 5.

With reference to Figures 3, 4 and 5 of the drawings it will be seen that the valves 20 and 27 move in a clockwise direction from the positions of Figure 5 to the positions of Figure 3, in a counter-clockwise direction from the positions of Figure 3 to the positions of Figure 4 and in a clockwise direction from the positions or Figure 4 to the positions of Figure 5. These movements are accomplished by mechanism of simple character which includes the cam shaft 4, and operating cam 32 on said cam shaft and a rod 33 which is operated by the cam 32 and which is connected at its upper end to a wrist pin 34 mounted on the head 30. The cam 32 rotates in a clockwise direction, Figure 7 of the drawings being considered, and is suitably shaped to provide for the above described operations of the valves 20 and 27. The invention includes means for regulating the timing of the ignition. ne form of such means applic        .onstruction of Figures 1 and 2 ι᎒ shown in Figure 7 and consists of an adjustable element 35 which is interposed between the rod 33 and the cam 32, said rod resting upon said element and the latter engaging the surface of the cam and forming a functional continuation of the rod 33. The element 35 is adjustable along the periphery of the cam and in such adjustment its position, relatively to the rises of the cam, is varied with the result of correspondingly varying the timing of the movements of the rod 33 and the valves 20 and 27 operated thereby. In this way the valve 27 may be operated to uncover the fuel discharge opening 23 at any desired point in the compression stroke from which it follows that the timing of the ignition is correspondingly regulated, i. e., advanced or retarded. The spring 31 urges the rod 33 against the element 35, the rod supporting face of which is flat and sufficiently extensive to be effective in any position to which the element 35 may be adjusted with reference to the cam 32. Any suitable means may be provided for effecting the adjustment of the element 35. As shown and preferred the element 35 is provided at the outer end of an arm 36 which is pivoted eccentrically as at 37 to a disk 38 suitably mounted for rotation about its axial center and operated by an adjusting handle 39. It will be apparent that as the handle 39 is turned in one direction or the other the disk 38 transmits movement in a corresponding direction to the element 35 whereby to shift the same along the periphery of the cam 32.

The oil supplied through the duct 17 may flow by gravity from an elevated tank or a measured charge of such oil may be delivered under slight pressure from a suitable pump. Figure 8 shows a pump which is satisfactory for the purposes in view and which includes a casing 40 having valve controlled inlet and outlet connections 41 and 42 which may be fitted in the oil line. The charge of oil is delivered by means of a sliding piston 43 which is preferably spring loaded as at 44 and which is operated against the pressure of the spring 44 by a cam 45 mounted on a shaft 46 suitably driven from the cam shaft 4. The rod of the piston 43 is provided with an engaging head 48 and is threaded as at 49 into a socket formed in said head whereby the piston rod may be adjusted to project to any desired extent beyond the head 48 for the purpose of regulating the stroke of the piston and hence the amount of oil delivered by the piston on each operation thereof. The spring 44 bears at one end against a nut 50 which is threaded on the rod of the piston 43 and which may be adjusted to regulate the tension of said spring.

Figures 10 to 15 illustrate a construction wherein the valve organization is substantially similar to that described but is arranged vertically instead of horizontally and is operated from the rocker arm which operates the air intake valve 8. The same reference characters but distinguished by the exponent *a*, are used to designate the parts which correspond in structure and arrangement to the parts described. These parts are the plug 16ª fitted in the vertical bore 15ª and provided with the fuel duct 17ª, the fuel cup 19ª with its bottom 21ª exposed to the heat of the combustion space and with its discharge opening 23ª, the valve 20ª controlling the duct 17ª and provided with the fuel passage 28ª, the valve seat 22ª, the valve 27ª controlling the fuel discharge opening 23ª and projecting from the under face of the valve 20ª with which it is integrally formed, the valve operating stem 29ª, the head 30ª fixed on the upper end of said stem and the spring 31ª which holds the valve 20ª constantly against its seat 22ª.

In this case the rocker arm 13 for the operation of the air inlet valve 8 is also utilized for the operation of the valves 20ª and 27ª, the connections comprising an arm 51 on the head 30ª, a tappet 52, preferably in the form of a friction roller on the rocker arm 13 and a lever 53, pivotally mounted at its lower end as at 54 and throughout its upper portion projecting between the arm 51 and the tappet 52 with which it has bearing engagement and is shaped to co-operate. It will, of course, be understood that the cam which controls the operation of the rocker arm is shaped not only to produce the required operations of the air inlet valve but also to produce movements of said rocker arm whereby the required operations of the valves 20ª and 27ª will be effected.

In Figures 10 to 15 it is assumed that the tappet 52 is mounted on the portion of the rocker arm which co-operates as a tappet with the air inlet valve 8, such portion being shown in Figures 10, 11 and 12. When the rocker arm moves downward, that is to say in the direction required for the opening of the valve 8, the lever 53 will be moved to the left, Figures 10, 11 and 12 of the drawings being considered, and in such movement will turn the valves 20ª and 27ª. The extent and direction of the turning movements of these valves will, of course, depend on the extent and direction of the movements of the rocker arm. The operations of the valves 20ª and 27ª as effected by the rocker arm 13 and spring 31ª will be obvious from the foregoing description, and it only remains to point out that Figure 13 illustrates the positions of these valves during the suction stroke, Figure 14 their positions during the compression stroke and Figure 15 their positions during the power and scavenging strokes, these positions corresponding to the positions of the valves 20 and 27 shown in Figures 3, 4 and 5, respectively.

The modified construction shown in Figures 10, 11 and 12 permits of varying the timing of the ignition by any means suitable for the purpose in view. One example of such a means is shown in Figure 16 according to which the lever 53 is pivoted at its lower end to a link 54ª which also has a stationary pivot 54ᵇ. The link 54ª is provided with an arm 55 which is pivoted to a collar 56 mounted on a threaded upright post 57 suitably journaled in the head of the engine and provided with a knurled finger piece 58. By rotating the post 57 the collar 56 is moved up or down according to the direction of rotation and in its movement rocks the link 54ª about its pivot 54ᵇ, thus varying the angular relation of the lever 53 to the tappet 52 and arm 51 with the result of varying the timing of the movement of the arm 51 consequent to the movements of the tappet 52 and hence varying the timing of the ignition as controlled by the valve 27ª.

Having fully described our invention, we claim:

1. The combination with a cylinder and a piston of an oil burning engine of a fuel cup subject to the heat developed in the combustion space of said cylinder and having an unrestricted fuel discharge opening communicating with said space, a valve controlling the supply of fuel to said cup and operated at a period of the operation of the engine to admit a charge of fuel into said cup and a second valve closing the unrestricted discharge opening during the compression stroke, said second valve being operated to uncover said discharge opening at a definite period of the compression stroke, said cup being in communication with said cylinder only when said second valve uncovers said discharge opening.

2. The combination with a cylinder and a piston of an oil burning engine of a fuel cup subject to the heat developed in the combustion space of said cylinder and having an unrestricted fuel discharge opening communicating with said space, a valve controlling the supply of fuel to said cup and operated at a period of the operation of the engine to admit a charge of fuel into said cup and a second valve operatively connected to the first valve and operated thereby to close the unrestricted discharge opening during the compression stroke and to uncover said opening at a definite period of the compression stroke, said cup being in communication with said cylinder only when said second valve uncovers said discharge opening.

3. The combination with a cylinder and a piston of an oil burning engine of a fuel cup subject to the heat developed in the combustion space of said cylinder and having an unrestricted fuel discharge opening communicating with said space, a valve controlling the supply of fuel to said cup and operated at a period of the operation of the engine to admit a charge of fuel into said cup, a second valve closing the unrestricted discharge opening during the compression stroke, said second valve being operated to uncover said discharge opening at a definite period of the compression stroke, and operating means for said second valve including an adjustable element for varying the period of the compression stroke at which the discharge opening is uncovered.

4. The combination with a cylinder and a piston of an oil burning engine of a fuel cup subject to the heat developed in the combustion space of said cylinder and having an unrestricted fuel discharge opening communicating with said space, a valve controlling the supply of fuel to said cup and operated at a period of the operation of the engine to admit a charge of fuel into said cup, a second valve operatively connected to the first valve and operated thereby to close the unrestricted discharge opening during the compression stroke and to uncover said opening at a definite period of the compression stroke, and means for operating said first named valve including an adjustable element for varying the period of the compression stroke at which the discharge opening is uncovered.

5. The combination with a cylinder and a piston of an oil burning engine of a fuel cup subject to the heat developed in the combustion space of said cylinder and having a fuel discharge opening communicating with said space, a valve controlling the supply of fuel to said cup and operated at a period of the operation of the engine to admit a charge of fuel into said cup, a second valve closing the discharge opening during the compression stroke, said second valve being operated to uncover said discharge opening at a definite period of the compression stroke, and operating means for said second valve including an adjustable element for varying the period of the compression stroke at which the discharge opening is uncovered.

6. The combination with a cylinder and a piston of an oil burning engine of a fuel cup subject to the heat developed in the combustion space of said cylinder and a part provided with a valve seat and with a duct open to said seat and through which liquid fuel is discharged into said cup, a valve constantly held to said seat and mounted to turn thereon, said valve having a certain position in which it permits the discharge of liquid fuel from said duct into said cup, the latter having a discharge opening communicating with the combustion space and a second valve operatively connected to the first valve and operated thereby to close the discharge opening during the compression stroke and to uncover said opening at a definite period of the compression stroke.

7. The combination with a cylinder and a piston of an oil burning engine of a fuel cup subject to the heat developed in the combustion space of said cylinder and a part provided with a valve seat and with a duct open to said seat and through which liquid fuel is discharged into said cup, a valve constantly held to said seat and mounted to turn thereon, said valve having a certain position in which it permits the discharge of liquid fuel from said duct into said cup, the latter having a discharge opening communicating with the combustion space and a second valve fitted within said cup and formed as an integral angular extension of the first named valve, said second valve being operated by the first named valve to close the discharge opening during the compression stroke and to uncover said opening at a definite period of the compression stroke.

8. The combination with a cylinder and a piston of an oil burning engine of a fuel cup subject to the heat developed in the combustion space of said cylinder and a part provided with a valve seat and with a duct open to said seat and through which liquid fuel is discharged into said cup, a valve constantly held to said seat and mounted to turn thereon, said valve having a certain position in which it permits the discharge of liquid fuel from said duct into said cup, the latter having a discharge opening communicating with the combustion space, a second valve operatively connected to the first valve and operated thereby to close the discharge opening during the compression stroke and to uncover said opening at a definite period of the compression stroke, and means for operating said first named valve including an adjustable element for varying the period of the compression stroke at which the discharge opening is uncovered.

In testimony whereof we affix our signatures.

GEORGE A. SCHWER.
OTTO E. BORNHAUSER.